United States Patent [19]

Güthaus et al.

[11] Patent Number: 4,995,042
[45] Date of Patent: Feb. 19, 1991

[54] SWITCHING EXCHANGE

[75] Inventors: Roland Güthaus, Nuremberg; Andrea Lamm, Neunkirchen-Speikern, both of Fed. Rep. of Germany

[73] Assignee: U.S. Philips Corporation, New York, N.Y.

[21] Appl. No.: 296,269

[22] Filed: Jan. 9, 1989

[30] Foreign Application Priority Data

Jan. 16, 1988 [DE] Fed. Rep. of Germany ....... 3801123

[51] Int. Cl.$^5$ .............................................. G06F 11/18
[52] U.S. Cl. .................................................. 371/68.2
[58] Field of Search ..................... 371/68.1, 68.3, 68.2, 371/69.1, 36

[56] References Cited

U.S. PATENT DOCUMENTS

| | | | |
|---|---|---|---|
| 3,431,557 | 3/1969 | Thomas | 371/68.1 X |
| 3,770,948 | 11/1973 | Caputo | 371/68.3 |
| 4,233,682 | 11/1980 | Liebergot | 371/68.1 |
| 4,271,515 | 6/1981 | Axtell | 371/68.1 X |
| 4,360,918 | 11/1982 | Ruhnau | 371/69.1 |
| 4,400,792 | 8/1983 | Strelow | 371/68.3 X |
| 4,737,951 | 4/1988 | Krüger et al. | 370/58 |
| 4,745,542 | 5/1988 | Baba | 371/68.3 X |
| 4,852,105 | 7/1989 | Kurz | 371/69.1 |

OTHER PUBLICATIONS

Th. Krol, The '(4,2) Concept' Fault-Tolerant Computer, Philips Tech. Rev., vol. 41, 1983/84, #1, pp. 1–11.

*Primary Examiner*—Jerry Smith
*Assistant Examiner*—Robert W. Beausoliel
*Attorney, Agent, or Firm*—Anne E. Barschall

[57] ABSTRACT

If a failiure of a switching exchange occurs caused by an error, a large number of subscribers are involved. Therefore, switching exchanges are to be protected against a failure. Thereto, in the switching exchange described hereinbefore, the switching network is constituted by three parallel sub-switching networks, whereas each sub-switching network performs the integral switching operations. A selection logic selects for each connection from the data that have been switched three times always the data which have the highest probability of being error-free.

11 Claims, 1 Drawing Sheet

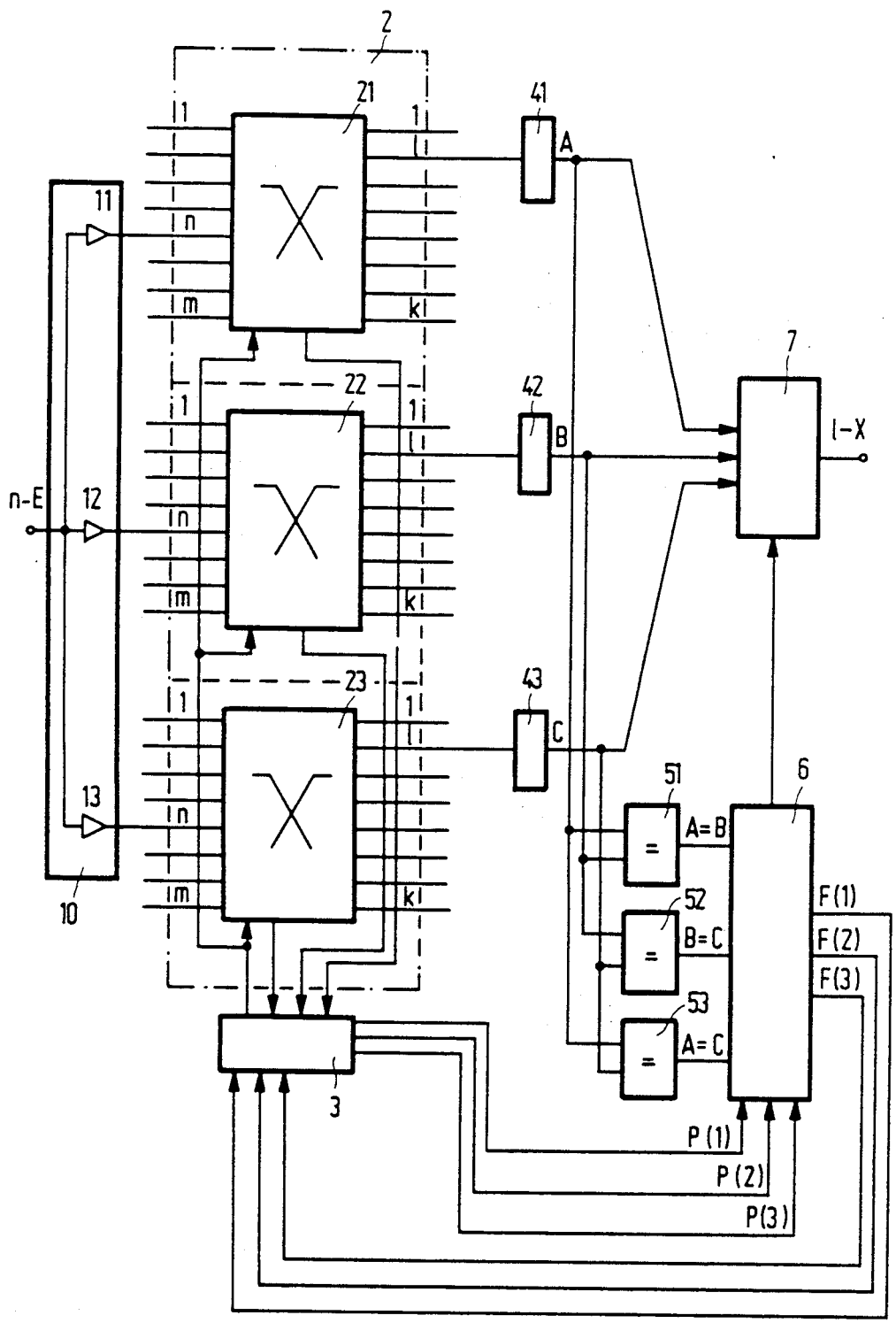

SWITCHING EXCHANGE

The invention relates to a switching exchange for switching in a computer-controlled manner digital input data words having a constant data word length, which are applied to a switching network through a plurality of input lines and which are transferred by the switching network to an output line in accordance with a connection request.

Such switching exchanges, wherein especially the switching networks have different structures, are widely known and are used for switching a large number of subscriber stations. Since a failure due to a fault of such a switching exchange relates to a large number of subscribers, stringent requirements are made on the reliability of such switching exchanges, especially on the computer for generating the control data to adjust the switching networks, because one fault in this control computer can cause a failure of the entire switching exchange. Therefore, it is common usage to provide a duplication or triplication of at least the control computer for switching exchanges, as appears from the article in the periodical "Philips Technical Review" Vol. 41, No. 1983/84, No. 1, pp. 1 to 11. In this article it is also explained how it is achieved by means of a specific concept of fault-protection, that the complete switching exchange does not break down in the case of a failure of one of a plurality of computers.

It is known that data to be transferred are safeguarded by adding redundant bits which can be derived in various ways, or by completely recoding them, whereas according to the number of added redundant bits a more or less extensive restoration of distorted data words is possible and in each case extensive recognition of distorted data words that cannot be restored. For this purpose, encoders are inserted on the input side of the switching network and decoders on the output side of the switching network.

Furthermore, from the West German patent application DE-PS No. 35 37 451 the switching network is known to be subdivided into various sub-switching networks. A code word produced by a coder from an input data word is subdivided into four sub-code words, whereas each of the sub-code words is no more than half the length of the input data word. Each sub-code word is then transferred through a sub-switching network. To the sub-switching networks decoders are connected, regenerating the original code words from all sub-code words. Code words and sub-code words are structured such that the decoders are in a position to reconstruct the data words and produce error signals if there are distorted sub-code words. The error signal indicates in which sub-switching network the error has occurred. The subdivision into four sub-switching networks affords the advantage that, without disturbing any connections, a faulty sub-switching network can be exchanged while the switching exchange is in operation. However, the coding and decoding of the data to be switched added to circuitry and expense. Specifically at high signal transfer rates the signal delay times in coders and decoders are noticeable to an annoying degree.

It is an object of the invention to provide a switching exchange of the type mentioned in the opening paragraph, in which the data to be switched are transferred through the switching network such that in case of faults especially in the switching network, distorted data words can be recognized as distorted and corrected if necessary and repairing faulty components is possible in a simple manner without disturbing the switching operation, while the cost of circuitry is maintained at the lowest possible level.

This object is accomplished in that the switching network is constituted by three parallel sub-switching networks, each data input word being applied to each sub-switching network and in that three respective corresponding outputs of the sub-switching networks are connected to inputs of a multiplexer and connected in pairs to the inputs of three comparators, the outputs of the comparators being connected to a selection logic, whose output is connected to the control input of the multiplexer.

Further advantageous embodiments of the invention are apparent from the sub-claims.

The invention will now be further described and explained with reference to the embodiments represented in the drawing Figure.

The invention is based on the concept of transferring each data input word through three mutually independent signal paths and comparing them with each other directly after this transfer. In the embodiment of the invention the switching network 2 is thereto constituted by three individual, parallel sub-switching networks 21, 22 and 23 of the same structure each having m input lines and k output lines. From the m input lines leading to the switching network and the k output lines leading away from this switching network and the circuitry connect to these lines, the drawing Figure follows only one line through the switching arrangement for clarity. It shows the signal path between an $n^{th}$ input n-E and an $l^{th}$ output l-X through the switching network 2.

Each one of the input lines E leading to the switching network is distributed over the three sub-switching networks by a distributor which is provided m times according to the number of input lines. The $n^{th}$ input line is for example connected to the distributor 10. Each distributor comprises three decoupling stages—the distributor 10 comprises for example decoupling stages 11, 12 and 13—, whose inputs are interconnected. Each output of a decoupling stage is connected to a respective input of a sub-switching network, the order of the sub-switching network connections being the same. This implies that the $n^{th}$ input n-E is connected to the $n^{th}$ distributor 10 and the output of the first decoupling module 11 of this $n^{th}$ distributor 10 is connected to the $n^{th}$ input of the first sub-switching network 21, the output of the second decoupling module 12 to the $n^{th}$ input of the second sub-switching network 22 and the output of the third decoupling module 23 to the $n^{th}$ input of the third sub-switching network 23. Thus, each sub-switching network receives the same input data at the same inputs.

The connection data for the sub-switching networks are calculated by a connection computer 3 and applied simultaneously to all sub-switching networks. In each sub-switching network the same transmission path is switched through in this manner for one and the same connection request. There is a known multiple use of the connection computer 3 to provide error-protected connection set up.

Each output of the sub-switching network is connected to a register in which the switched data are buffered briefly. With k output lines three times k registers are provided. Comparable outputs in the right order of the three sub-switching networks are combined to groups of three. The $l^{th}$ output of the first sub-switching network 21 is connected to a first register 41, the $l^{th}$ output of the second sub-switching network 22 to a second register 42 and the first output of the third sub-switching network 23 to a third register 43. The data words A, B and C are available at the outputs of the respective registers 41, 42 and 43. As long as no signal distortions develop on the signal path through the switching network, the data words A, B and C have identical data contents since they all originate from the same input data word.

Each output of the register is connected to a data input of a multiplexer 7 and also to the inputs of comparators 51, 52 and 53, which compare the data words A, B and C to each other in pairs, so that any combination of two is verified. For this purpose, the data words A and B are applied to the two inputs of the first comparator 51, the data words B and C to the second inputs of the second comparator 52 and the data words A and C to the two inputs of the third comparator 53. If the two data words to be compared each time match, the relevant comparator furnishes at its output a positive logic level. The output signals of these comparators 51, 52, 53 are applied to an evaluation logic 6, which controls a multiplexer 7. By means of the multiplexer 7 one of the three data words A, B or C is selected as the output value. In accordance with k output lines the k comparators are provided three times, the multiplexer 7 and the evaluation logic 6 are provided k times.

The following selecting rule is implemented. If all three data words match, it may be assumed that all three data input words were correctly transferred through the switching network. Any of the data words A, B and C can be selected to be the output data word. In the embodiment of the invention the selection logic is structured such that in this case the data word A is always selected in preference to corresponding control information which is applied to the data selecting input of the multiplexer 7.

On the other hand, if no more than two data words match, the third data word which does not match is likely to be distorted. Although each of the two matching data words can be selected to be the output data word, the data word A always has priority over data word B and the latter over data word C, on the basis of the structure of the evaluation logic chosen in the embodiment of the invention.

Thus, if the first data word and the second data word B match, A is selected as the output word through the multiplexer 7 and an error signal F(3), indicating an error in the third sub-switching network 23, is generated. If the second data word B and the third data word C match, the second data word B is selected and an error signal F(1) is generated for the first sub-switching network 21. If, however, the first data word A and the third data word C match, again the first data word A is selected and an error signal F(2) is generated for the second sub-switching network 22.

If, alternatively, the three data words do not correspond, there is equal probability that one of the three data words is correct. On the basis of the priority control of the evaluation logic the data word A is selected at random and error signals are generated for all three sub-switching networks.

In this way a data word is always selected which has the highest probability of corresponding with the input data word. All error signals assigned to a sub-switching network are combined to one error signal in an OR gate (not shown), so that already with a single distorted data word a fault is indicated in the relevant sub-switching network. The error signal is thereto used, for example, for an optical status display.

The use of three sub-switching networks is advantageous because when one sub-switching network fails there are still two data words left which can be compared to each other. In this way undisturbed operation of the switching exchange is usually possible while the remaining two sub-switching networks are verified for transmission faults. Consequently, a sub-switching network designated as defective can be exchanged while the switching exchange is in operation, without disturbing the process of the switching operation. The circuit expenditure for the evaluation and error detection logic is very low and due to the simple logic structure only insignificant signal delays will occur in the evaluation logic.

When exchanging a sub-switching network, the operation of the switching exchange as described hereinbefore is not interrupted. To all inputs of the registers 51, 52, 53 the logic "high" level is applied through pull-up resistors which are not shown. Now, if one of the two remaining sub-switching networks fails, so that it also furnishes a constant "high" level at one or various outputs, these two distorted output values would match and be selected as correct values. If such a fault occurs in all output data of a sub-switching network, an error signal will not be generated any more. Therefore, in a further advantageous embodiment of the invention presence signals P(1), P(2) and P(3) respectively, are applied to the selection logic 6 through three further inputs. This signal indicates whether the switching network assigned to each signal is operative. In the simplest case this signal is produced by a switch which is turned on after a sub-switching network is inserted and turned off before a sub-switching network is removed. The selection logic 6 is structured such that when there is no presence signal available the output data of the sub-switching network concerned are not used for selecting the data considered correct for this sub-switching network. At any rate, however, an error signal is produced.

In this way, operating the switching exchange is even possible with only one sub-switching network, because the faulty two sub-switching networks are disregarded for the selection of the data word considered correct on account of the failure of the presence signal assigned thereto. Although the registers concerned also receive constant "high" levels, only the output data of the remaining sub-switching network in the switching exchange are switched through.

In a further embodiment of the invention the presence signal is produced by means of a constant automatic test of elementary functions of the sub-switching network concerned. These functions are, for example, the control of the operating voltage and the presence of the system clock. For this purpose, each sub-switching network comprises one monitoring arrangement which applies the presence signal produced thereby to the relevant inputs of the evaluation circuits through a signal line.

After a sub-switching network is inserted it will first supply faulty data words, since it lacks the connection information of the existing connections. Therefore, in a further embodiment of the invention, only the connection computer 3 receives the presence signals of the sub-switching network. This affords the advantage, with a change of the presence signal from logic "low" to logic "high", that the computer recognizes that a sub-switching network has been inserted again. Thereupon, the computer controls an update routine by means of which all connection data are transmitted to the newly inserted sub-switching network about the existing connections. Since the error signals are further applied to the computer, it is in a position to monitor whether the newly inserted sub-switching network operates properly. Only then will the corresponding presence signal be passed on to the evaluation logic and only from this instant onwards will the output data of the newly inserted sub-switching network be used for the selection. In this way a high degree of performance reliability of the whole switching exchange will be attained.

What is claimed is:

1. A switching exchange for switching in a computer-controlled manner digital input data words having constant data word lengths, which input data words are applied to a switching network through a plurality of input lines and which input data words are transferred by the switching network to an output line in accordance with a connection request, wherein the switching network (2) comprises three parallel sub-switching networks (21, 22, 23), each data input word being applied to each sub-switching network and wherein three respective corresponding outputs of the sub-switching networks (21, 22, 23) are connected to inputs of a multiplexer (7) and connected in pairs to the inputs of three comparators (51, 52, 53), which comparators pairwise compare complete versions of the input data words as the input data words appear at the corresponding outputs of the three sub-switching networks, the outputs of the comparators (51, 52, 53) being connected to a selection logic (6), whose output is connected to a control input of the multiplexer (7).

2. A switching exchange as claimed in claim 1, wherein the selection logic (6) produces an error signal for data words which do not match.

3. A switching exchange as claimed in claim 1 or 2, wherein a monitoring arrangement connected to the selection logic (6) is allocated to each sub-switching network (21, 22, 23), so that its proper working order can be monitored.

4. A switching exchange comprising:

(a) m input lines for receiving digital input data words each having a constant word length, where m is an integer greater than one;

(b) k output lines, where k is an integer greater than one;

(c) a switching network for transferring the input data words from the input lines to the output lines, the switching network including:

(i) three parallel sub-switching networks, each data word being applied to each sub-switching network, each sub-switching network having m input lines and k output lines;

(ii) k parallel multiplexers, each multiplexer having three respective inputs for coupling with three respective corresponding outputs of the sub-switching networks;

(iii) k parallel groups of three parallel comparators, respective inputs of each group of three comparators being connected in pairs to the three respective inputs of a respective one of the multiplexers, the comparators being for pairwise comparing complete data words input to the respective one of the multiplexers; and (iv) selection logic having inputs coupled to outputs of the comparators and having outputs coupled with control inputs of the multiplexers.

5. The exchange of claim 4 wherein the selection logic produces an error signal in response to one of the comparators indicating data words which do not match.

6. The exchange of claim 4 further comprising means coupled with the evaluation logic for monitoring proper working of the sub-switching networks.

7. The exchange of claim 5 further comprising means coupled with the selection logic for monitoring proper working of the sub-switching networks.

8. The exchange of claim 5 wherein, when one of the sub-switching networks is removed, the monitoring means supplies a signal to the selection logic so that the selection logic ignores outputs of those comparators coupled with the removed sub-switching network.

9. The exchange of claim 8 wherein the monitoring means comprises a connection computer which initializes a newly inserted sub-switching network.

10. The exchange of claim 4 wherein the selection logic comprises k selection logic means, one for each of the multiplexers.

11. The exchange of claim 4, wherein when one of the comparators in a group of three indicates matching data words and the other two indicate no match, the selection logic causes the multiplexer corresponding to that group of three comparators to select one of the two data words which match.

* * * * *